T. JENKINS.
CONTINUOUS TROLLEY CONNECTIONS FOR BRIDGES.
APPLICATION FILED APR. 8, 1916.
1,208,564.
Patented Dec. 12, 1916.
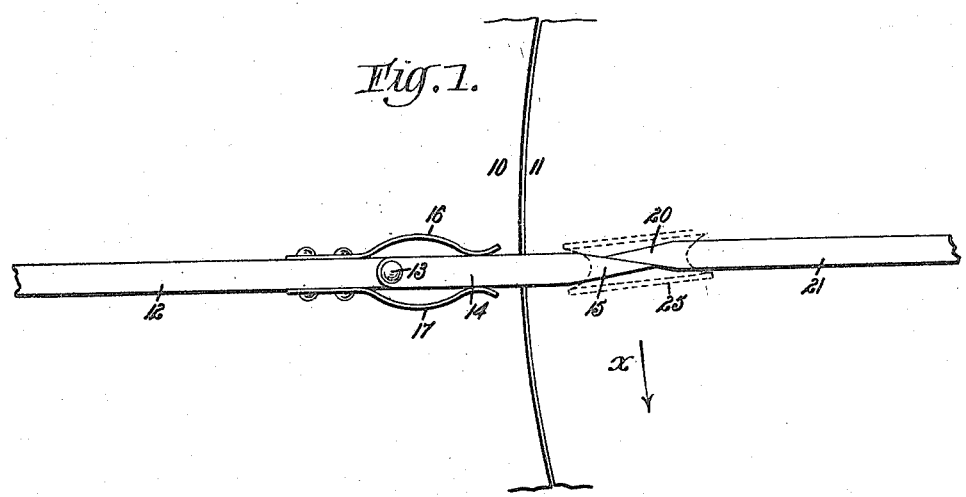
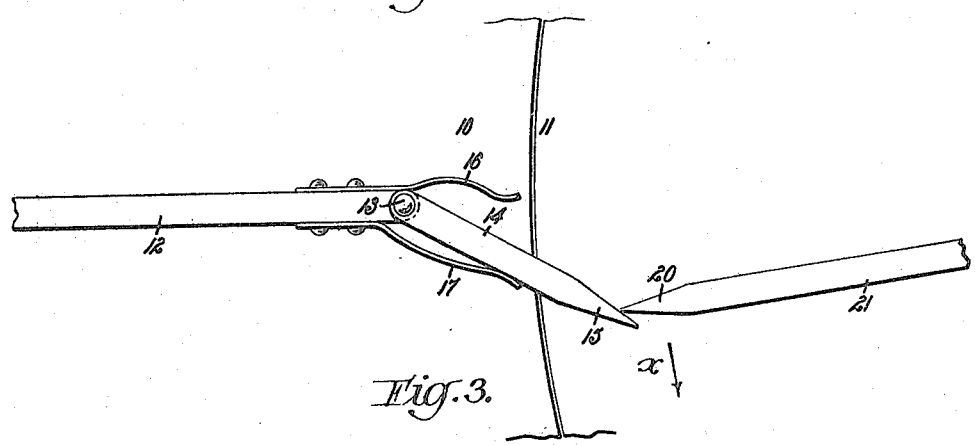
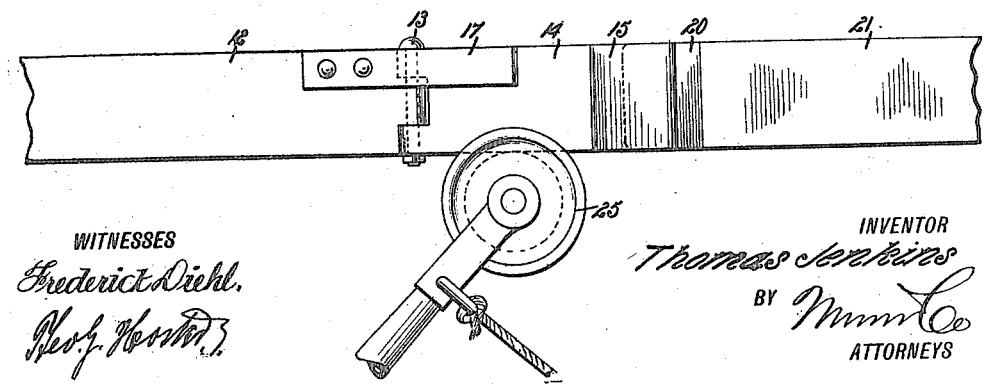
WITNESSES
INVENTOR
Thomas Jenkins
BY
ATTORNEYS

UNITED STATES PATENT OFFICE.

THOMAS JENKINS, OF NEW YORK, N. Y., ASSIGNOR OF ONE-HALF TO JOHN MILO, OF NEW YORK, N. Y.

CONTINUOUS TROLLEY CONNECTIONS FOR BRIDGES.

1,208,564.

Specification of Letters Patent. Patented Dec. 12, 1916.

Application filed April 8, 1916. Serial No. 89,803.

*To all whom it may concern:*

Be it known that I, THOMAS JENKINS, a citizen of the United States, and a resident of the city of New York, borough of the Bronx, in the county of Bronx and State of New York, have invented a new and Improved Continuous Trolley Connection for Bridges, of which the following is a full, clear, and exact description.

The invention relates to trolley lines passing over swing and other movable bridges, and its object is to provide a new and improved continuous trolley connection arranged to insure a proper electric connection between the land conductor and the bridge conductor with a view to avoid a break in the car circuit at the time the car passes from the line onto the bridge or off the latter back onto the land, and to allow convenient opening and closing of the bridge without requiring handling or other adjustment of the connection.

In order to accomplish the desired result, use is made of a land conductor, a bridge conductor and a connecting member yieldingly mounted on the end of one of the said conductors and adapted to engage the adjacent end of the other conductor.

A practical embodiment of the invention is represented in the accompanying drawings forming a part of this specification, in which similar characters of reference indicate corresponding parts in all the views.

Figure 1 is a plan view of the continuous trolley connection with the parts in position at the time the bridge is closed; Fig. 2 is a similar view of the same with the parts in position at the time the bridge is partly open; and Fig. 3 is a side elevation of the same.

As shown in Figs. 1 and 2, the land abutment 10 is adjacent one end of the bridge 11 over which passes the trolley line. The land conductor 12 terminates a distance from the bridge 11 and is provided at this end with a vertically disposed pivot 13 on which is mounted to swing a tongue 14 extending with its free wedge-shaped end 15 over onto the bridge 11. The tongue 14 is pressed on at opposite sides by two springs 16 and 17 so as to normally hold the tongue 14 in longitudinal alinement with the land conductor 12.

The free end 15 of the tongue 14 engages a correspondingly wedge-shaped end 20 of the bridge conductor 21 and which end 20 terminates a distance from the corresponding end of the bridge 11. It will be noticed that by the arrangement described the trolley wheel 25 can readily pass from the land conductor 12 onto the bridge conductor 21 or vice versa without breaking the circuit for the car owing to the contact between the wedge-shaped ends 15 and 20 of the tongue 14 and the bridge conductor 21. Thus a continuous trolley action is had for the trolley wheel 25 as long as the bridge is in closed position. When the bridge 11 swings into open position, say in the direction of the arrow $x$, then the end 20 of the bridge conductor 21 imparts a sidewise swinging movement to the tongue 14 to compress the spring 17, and when the end 20 has finally passed the end 15 of the tongue 14 then the latter returns to its normal position by the action of the spring 17. When the bridge is returned into closed position the end 20 reëngages the end 15 of the tongue 14 thus again establishing a continuous connection between the land and bridge conductors. It will be noticed that the bridge may be opened and closed in either direction as the corresponding springs 16 and 17 always return the tongue 14 to normal position.

The continuous trolley connection shown and described is very simple in construction and can be readily applied to the land and bridge conductors now generally constructed.

Having thus described my invention, I claim as new and desire to secure by Letters Patent:

1. A continuous trolley connection for draw-bridges, comprising a land conductor, a bridge conductor, a tongue vertically pivoted on the end of one of said conductors and adapted to engage in over-lapping horizontal relation the adjacent end of the other conductor, and resilient means for normally holding the said tongue in alinement with the conductor on which it is vertically pivoted and permit its deflection by the other conductor.

2. A continuous trolley connection for draw-bridges comprising a land conductor, a bridge conductor terminating short of the end of the bridge, a tongue vertically pivoted to one end of the land conductor, and adapted to engage in overlapping horizontal relation the adjacent end of the bridge conductor, and resilient means for normally holding said tongue in alinement with the conductor to which it is vertically pivoted, and permit its deflection by the other conductor.

3. A continuous trolley connection for bridges, comprising a land conductor terminating short of the bridge, a bridge conductor having a wedge-shaped end and terminating short of the end of the bridge, a tongue pivoted on the end of the said land conductor on a vertical pivot and having a wedge-shaped end adapted to project over the bridge and engage the wedge-shaped end of the said bridge conductor, and springs attached to the land conductor and engaging the sides of the said tongue to normally hold the latter in alinement with the land conductor and to allow the tongue to be deflected by the bridge conductor on opening or closing the bridge.

THOMAS JENKINS.

Copies of this patent may be obtained for five cents each, by addressing the "Commissioner of Patents, Washington, D. C."